US006785280B1

(12) United States Patent
Tovander

(10) Patent No.: US 6,785,280 B1
(45) Date of Patent: Aug. 31, 2004

(54) MECHANISM AND METHOD DYNAMICALLY ALLOCATING ATM CONNECTIONS BETWEEN EXCHANGES

(75) Inventor: Lars A. Tovander, Plano, TX (US)

(73) Assignee: Ericsson Inc., Plano, TX (US)

( * ) Notice: Subject to any disclaimer, the term of this patent is extended or adjusted under 35 U.S.C. 154(b) by 0 days.

(21) Appl. No.: 09/219,577

(22) Filed: Dec. 23, 1998

(51) Int. Cl.[7] ............................................. H04L 12/28
(52) U.S. Cl. .................................. 370/395.1; 370/410
(58) Field of Search ................................. 370/401, 466, 370/467, 468, 395.1, 395.2, 395.5, 397, 329, 410, 522, 395.6, 395.61, 396, 399, 230, 524, 400, 232, 233, 234

(56) References Cited

U.S. PATENT DOCUMENTS

| | | | | |
|---|---|---|---|---|
| 4,870,641 A | * | 9/1989 | Pattavina | 370/397 |
| 5,029,164 A | * | 7/1991 | Goldstein et al. | 370/235 |
| 5,444,707 A | * | 8/1995 | Cerna et al. | 370/389 |
| 5,659,787 A | * | 8/1997 | Schieltz | 709/226 |
| 5,878,044 A | * | 3/1999 | Frischknecht et al. | 370/466 |
| 6,049,549 A | * | 4/2000 | Ganz et al. | 370/449 |
| 6,181,703 B1 | * | 1/2001 | Christie et al. | 370/410 |
| 6,205,134 B1 | * | 3/2001 | Jordan et al. | 370/352 |
| 6,396,840 B1 | * | 5/2002 | Rose et al. | 370/401 |

FOREIGN PATENT DOCUMENTS

| | | | | |
|---|---|---|---|---|
| GB | 0543610 | * | 5/1993 | ................. 709/300 |
| GB | 2 322 514 A | | 8/1998 | |
| WO | WO 92/16066 | | 9/1992 | |
| WO | WO 98/28884 | | 7/1998 | |

OTHER PUBLICATIONS

Nicholas S. Huslak, Steven A. Wright, and Amalendu Chatterjee, Beyond Private Networks: Impact of PNNI on Broadband Networking and Services, Oct. 1, 1996, pp. 202–213, XP–000754565.

* cited by examiner

*Primary Examiner*—Chi Pham
*Assistant Examiner*—Alexander O. Boakye

(57) ABSTRACT

An ATM connection (45) and call connection equipment 22 can be dynamically allocated between exchanges (20, 30). The connection is setup and released by a master switch (20) on one side of the connection. The slave 30 is controlled using standard signaling protocols and the physical connections (45) between the interworking units (40, 50) use circuit-emulation according to AAL1. The master (20) controls the ATM connection (45) with standard signaling and the slave (30) with normal trunk signaling. The ATM connection 45 and connection 26 can be setup between the nodes (40, 50) when needed based on the traffic needs of the network (10).

13 Claims, 2 Drawing Sheets

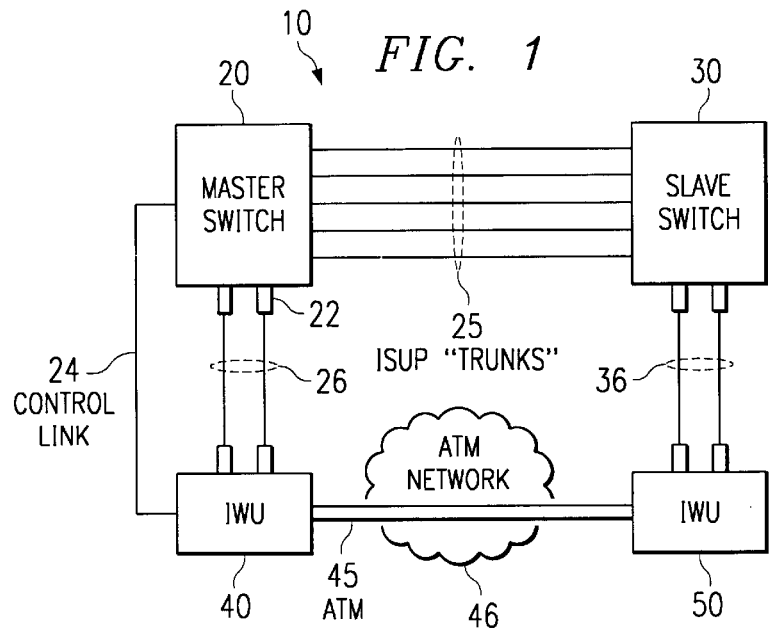
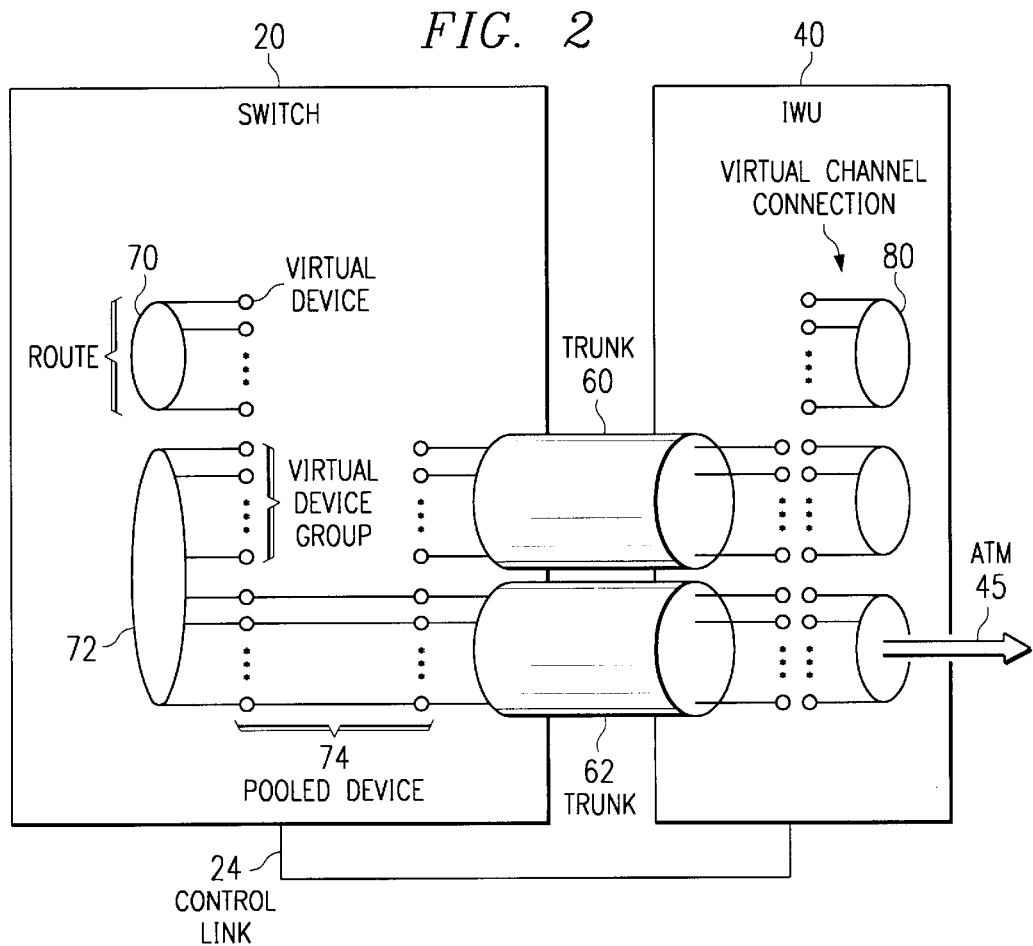

MECHANISM AND METHOD DYNAMICALLY ALLOCATING ATM CONNECTIONS BETWEEN EXCHANGES

FIELD OF THE INVENTION

The present invention relates to the field of voice over asynchronous transfer mode (ATM) and specifically to voice over ATM applications that terminate trunk signaling.

BACKGROUND OF THE INVENTION

Asynchronous transfer mode, commonly abbreviated as ATM, is a connection-oriented, cell based transport service designed to carry a wide variety applications including voice and video images as well as binary computer data over a single distributed switched network. ATM is well suited for the synchronized real time data traffic required by many multimedia applications. The ATM physical layer can take many forms including optical fiber, high speed copper or high speed co-axial wire. Virtually any physical medium can be used which supports a data rate higher than T1 (1.5 Mbps).

Since ATM is fundamentally a connection oriented technology, a connection must be established between sending and receiving nodes prior to data being transferred. This is in contrast to connectionless standards such as Ethernet or Frame relay where nodes send data based on the address of the data packet. A second aspect of ATM, as contrasted with other switching technologies, is that ATM is a cell based design. Typically, an ATM network consists of fixed length cells of 53 bytes. The cell is comprised of a five byte header and a 48 byte payload. A cell contains the image, video and voice transmission data. Coupled with the typical transmission speed of 155 Mbps per second and 622 Mbps provides the ability to build high performance switching system for public and private networks.

In an ATM network, an end-system requests a connection to another end point by transmitting a signal across the user network interface (UNI) to the network. This request is passed to a signaling entity within the network which passes it across the network to a destination. If the destination agrees to form a connection a virtual circuit is setup across the ATM network between two end systems. Mapping is defined between the virtual path identifier (VPI)/virtual circuit identifier (VCI) on both ends of the UNI and between the appropriate input link and corresponding output link of all intermediate switches.

The ATM adaptation layer (AAL) provides the foundation which gives ATM the ability to be service independent, in that ATM is not restricted or limited to a specific traffic type. Within the AAL there are different types of layers designed specifically for different types of traffic. For example, AAL1 handles encoded voice traffic, video and other similar types of data structures. In general, these AALs are defined as being specified by the services they support which, in turn, are based upon three basic transmission characteristics: the time relation between the source and the destination, the bit rate (constant, available, or variable), and the connection mode (connection oriented or connectionless oriented). These AAL services, are further classified into four classes defined by the international telecommunications union (ITU). Into these classes, the different type of network services fit.

As more video and voice applications such as imaging and multimedia are being used in a variety of settings the need for multiple high speed technologies will continue to increase. Currently there is a growing demand for voice and video over ATMs in areas such as tele-medicine, video distribution and distance learning. One feature that would help bridge the gap between ATM networks and such applications is the ability to dynamically allocate an ATM connection or "trunk" on demand. The problem with dynamic trunking, however, is that requires specific and proprietary implementations on both ends of the connection. This reliance on proprietary implementations makes dynamic trunking either a difficult or impossible function to implement in most cases.

Another problem associated with dynamic trunk allocation is that the call exchange hardware and connections are often static or dedicated to particular and specific destinations. The use of dedicated connections limits allocation in the areas where traffic needs exists by reducing the number of exchange configurations in the network. In order to accommodate other destinations new hardware must be added to the system or the existing hardware must be re-engineered thereby increasing the costs and complexity of the network. A way of utilizing the same switching hardware for use towards destinations where traffic increases would be advantageous.

SUMMARY OF THE INVENTION

The present invention provides a mechanism for dynamically allocating ATM connections between exchanges that reduces the hardware and maintenance costs of a network by optimizing the use of bandwidth capacity available for carrying voice data between a circuit switching platform and an interworking unit. The invention provides a means of pooling all devices in a node and making them available to traffic in any destination. In one embodiment, device pooling is accomplished in groups of devices forming so called "trunks" so that an individual device itself is not selected although the trunk handling the device is.

According to one embodiment, disclosed is a communications system for dynamically allocating asynchronous transfer mode (ATM) connections between exchanges. The system includes a transfer exchange controller coupled to a first slave exchange with a signaling link extending from the master exchange controller to the slave exchange. The master exchange controller is configured to establish a signal path to the slave exchange through one or more interworking units (IWUs) coupled to each one via an ATM connection. A control link couples the master exchange to a first IWU and a physical connection is established with the first connection IWU providing a signal pathway to the ATM connection. A second IWU at the far end of the ATM connection is likewise physically linked to the slave exchange. Once the physical connections between the IWUs are setup, they can be released and allocated as needed to accommodate traffic needs of the network. The slave exchanges can employ standard ISUP signaling protocols while communications with the IWUs can employ circuit emulation according to ATM adaptation layer 1 (AAL1).

According to another embodiment, disclosed is a method of dynamically allocating ATM connections between exchanges in a signaling network. The method comprises the steps of determining the traffic needs of the network and signaling a slave exchange to determine the capacity to handle the traffic. Next, an ATM connection is established with as many of the slave call exchange units as necessary to accommodate the traffic needs of the network. Standard ISUP signaling protocols can be used for signaling the slave call exchanges. A physical connection with an IWU is established between a master exchange in the network. Next, an ATM connection is established with other IWUs in the network and an IWU at the far end of the connection is physically connected to the slave exchange.

BRIEF DESCRIPTION OF THE DRAWINGS

Other aspects of the invention, including specific embodiments are understood by reference to the following detailed description taken in conjunction with the appended drawings in which:

FIG. 1 is a block diagram of a voice signaling network utilizing dynamic trunk allocation according to one embodiment;

FIG. 2 is a node view of the dynamic trunk pooled device feature according to one embodiment.

References in the detailed description refer to corresponding numbers and symbols in the figures unless otherwise indicated.

DETAILED DESCRIPTION OF THE PREFERRED EMBODIMENT

Figure 3:
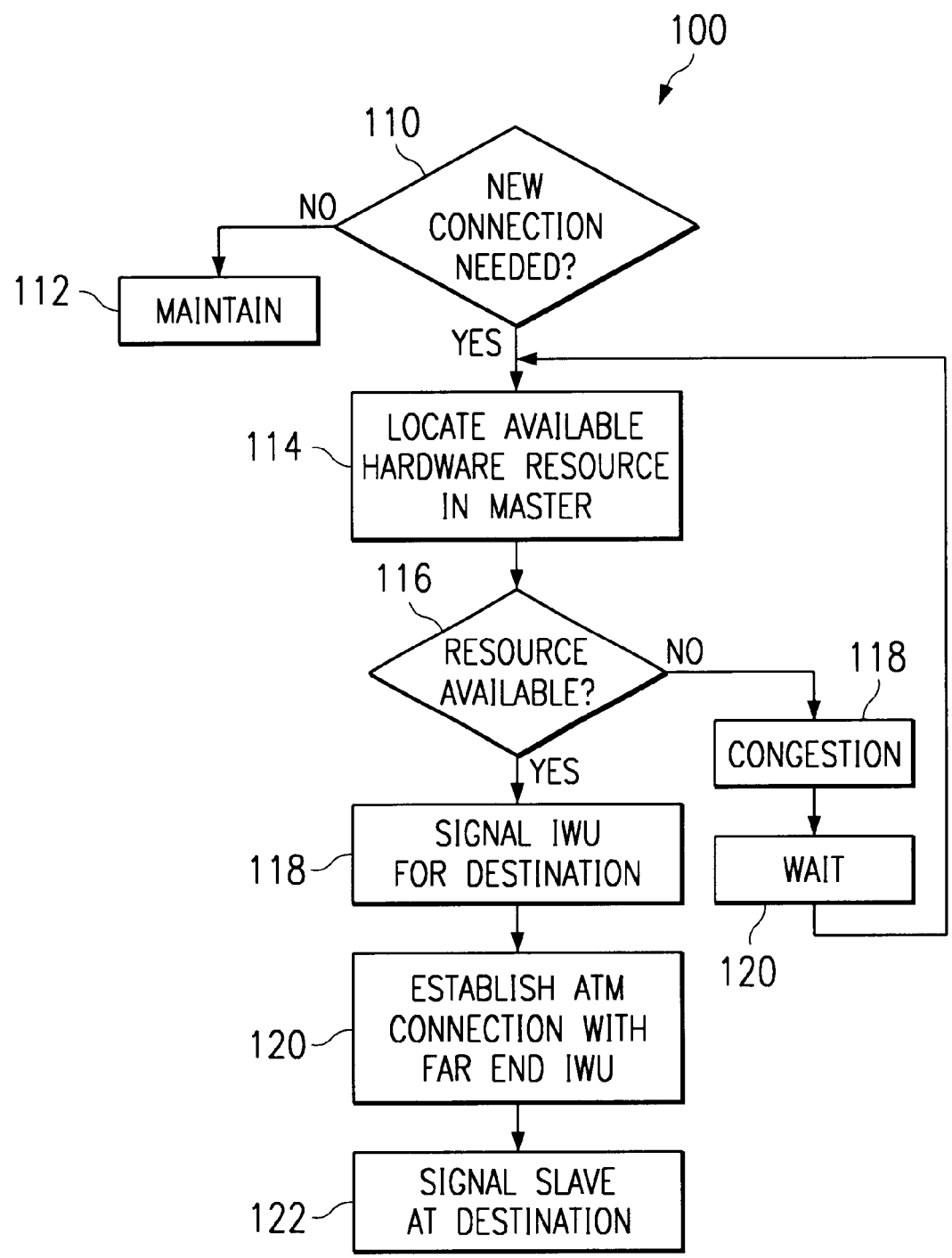
FIG. 3 is a process flow diagram of a method for establishing an ATM connection between exchanges in a network.

The present invention provide a mechanism for dynamically allocating trunks by establishing a physical connection through interworking units using circuit emulation according to ATM adaptation layer 1. In essence, the master side controls the ATM connection with proprietary signaling and the slave with normal trunk signaling. ATM connections are setup between nodes to accommodate the traffic needs of the network and can be released once they are no longer needed. A single master exchange can support a large number of slave exchanges.

Turning now to FIG. 1 therein is shown a block diagram of a network 10 utilizing dynamic trunk allocation according to one embodiment. In general the network 10 includes a master exchange or switch 20 and a slave exchange or switch 30 which communicate with one another through a plurality of virtual trunks 25. Typically, the signaling links employ standard ISDN user part (ISUP) signaling protocols forming ISUP trunks which are available for allocation depending on the current voice traffic needs of the network 10.

The master switch 20 can be thought of as providing a circuit switching platform for routing calls to one or more slave exchange units in the network 10 such as the slave switch 30. A call can enter the master switch 20 through one or more connections (not shown) such as an E1/T1 connection or one arriving through the Public Switch Telephone Network (PSTN). The master switch 20 is coupled to an interworking unit (IWU) 40 through one or more line cards, trunk cards or other similar call connection equipment device capable of establishing a physical connection 26 between the master switch 20 and the IWU 40. Element 22 in the master switch 20 is representative of the call connection equipment.

The IWU 40 is coupled to a second IWU 50 through ATM network 46 which provides a physical connection between at least two ATM nodes: a transmitting node and a receiving node. As shown in FIG. 1, the IWU 40 and IWU 50 form the transmitting and receiving nodes in the ATM portion of the network 10.

According to one embodiment, th physical connection 45 between the IWU 40 and IWU 50 uses circuit emulation according to ATM adaptation layer 1 (AAL1). AAL2 can be employed for other services and data types. The setup of the ATM connection 45 is configured through the control link 24 which provides a means for establishing and releasing ATM connections, verifying connections at restart and deriving status indication information, as well as other connections control functions. The control link 24 can be Ethernet or other protocol. The ATM connection 45 provides a pathway to the slave switch 30 utilizing the physical connections 26, 36 and ATM connection 45.

An advantage of the invention is that it allows the allocation and deallocaton of the call connection equipment 22 to be controlled at the master switch 20. The fact that the master side 20 of the network 10 controls the ATM connection 45 allows dynamic trunking to be achieved while at the same time reduces the hardware and maintenance costs associated with reconfiguring the call connection equipment 22 for a new destination.

With reference to FIG. 2, therein is shown a node view illustrating the dynamic trunk pooled devices feature of the present invention. The master switch 20 and IWU 40 are coupled through one or more trunks 60 and 62 which are allocated based on the traffic needs of the network 10. Essentially the IWU 40 provides an ATM switching platform which can be utilized to provide ATM connections between the master 20 and a corresponding slave exchange 30 in the network 10 based on the destination of the data. This is achieved by pooling all devices in the node and making them available to traffic to any destination. In one embodiment, device pooling is done in groups of devices which, in turn, form the trunks 60 and 62. This means that when an individual device in the master switch 20 is selected so is the trunk carrying the device.

As shown in FIG. 2, a route 70 comprises a group of virtual devices which can be grouped together to form a virtual device group. Thus, the route 70 constitutes a number of virtual devices that initially are not related to any circuits or pooled devices. The number of virtual devices in a route 70, however, is dependent on the granularity of a particular trunk, 60 or 62, and is related to a multiple of other devices within a trunk, 60 or 62. While only two trunks 60 and 62 are shown, it is contemplated that a plurality of trunks would be available for allocation between any master side and corresponding IWUs in a network. The route 70 can support a trunk structure by providing virtual device groups that can be linked to a trunk carrying pooled devices when brought into service.

One or more virtual channels 80 can be established between any two ATM switching platform nodes in the network 10. A virtual channel 80 is essentially an AAL1 data transfer connection between two nodes. By grouping the pooled devices into a number of trunks, any free trunk 60 or 62 can be selected and established on demand to a virtual device group 72 and any route at a given time.

A trunk, 60 or 62, can either be reserved manually by the operator establishing provisioned trunks and/or fixed dynamic trunks according to various embodiments. In addition, a trunk can be automatically provisioned by increased traffic loads established through switched dynamic trunks. The pooled device 74 can be seen as a transport mechanism only while device data is stored in the virtual device 70. The interface between the master switch 20 and the IWU 40 can be an E1/T1 interface carried either over E1/T1 links or multiplex over STM-1/SONET links.

The master switch 20 can control the foreign slave exchange 30 by standard ISUP signaling protocols. The physical connection 45 between the IWU nodes 40 and 50 can use circuit emulation according to AAL1. The master side 20 controls the ATM connections using SOFT permanent virtual connection procedures as specified by the ATM Form. Private Network-Network Interface Specification and the slave side 30 using normal trunk signaling with blocking and de-blocking signals. A particular ATM connection 45 is setup between the nodes 40 and 50 when needed based on traffic situations. In this way, one master exchange 20 can support a large number of slave exchanges.

With reference to FIG. 3, therein is shown a process flow diagram for a method 100 of dynamically allocating call connection equipment and ATM connections between nodes of a network. The process 100 begins at step 110 wherein the master switch 20 determines if a new connection is needed. If a new connection is not needed, process flow is directed at step 112 wherein the current connection status of the network 10 is maintained. Otherwise, process flow is directed to step 114 wherein the master switch 20 searches for any available resources available for directing data to a specified location in the network 10.

If a resource is available at step 116 then the master switch 20 signals the corresponding IWU at step 118. Otherwise the network 10 is in a state of congestion and no other connections can be established at that time. The congestion state 118 causes the master switch 20 to wait, step 120, until an available hardware resource is located at step 114.

If a hardware resource (i.e., equipment 22 and/or connection 26) is available for establishing the call, then the master switch 20 signals the IWU corresponding to a specified destination, step 118, and an ATM connection 45 is established with a far end IWU 50 associated with the slave switch 30 at step 120. Next, the far end IWU 50 signals the slave switch 30 at the destination point to complete the connection at step 122.

Process 100 has been described in connection with a single master switch 20 signaling a single slave switch 30. It should be understood, however, that in more general applications the master switch 20 can control a plurality of call switching exchanges and dynamically allocate ATM connections to such exchanges in a similar fashion. The hardware resources and control mechanisms illustrated in FIG. 2 can be applied in the general context where a single master switch controls a number of slave switches in a network. By grouping a set of virtual devices into a pooled set of devices in the master switch 20, traffic levels in the network 10 can be adjusted and trunks can be allocated to accommodate current traffic needs.

While the invention has been described with respect to a specific preferred embodiment, variations and modifications will become apparent to those skilled in the art upon reference to this specification. It is therefore intended that the appended claims be interpreted as broadly as possible in view of the prior art to include all such variations and modifications.

What is claimed is:

1. A communications system for dynamically allocating asynchronous transfer mode (ATM) connections between nodes in a network comprising:
   a master exchange switch for controlling a slave exchange switch through one or more trunk signaling links, wherein said master exchange switch is configured for:
      pooling all devices available to the master exchange switch into groups of virtual devices;
      determining if a new connection is needed in the network; and
      allocating groups of virtual devices to provide said new connections, if needed, by first grouping a number of virtual devices into a route used to carry network traffic;
   first and second interworking units (IWUs) coupled to said master exchange switch and said slave exchange switch through first and second physical connections, respectively; and
   an ATM connection forming a signal pathway between said first IWU and said second IWU, wherein said master exchange is configured to control the slave exchange and sets up said ATM connection through said first and second IWUs to dynamically create traffic routes extending from the master exchange to said slave exchange.

2. The communications system according to claim 1 wherein the master exchange switch employs standard ISUP signaling protocols to control the slave exchange switch.

3. The communications system according to claim 1 wherein physical connections between the second IWU and the slave uses Circuit Emulation according to ATM Adaptation Layer.

4. The communications system according to claim 1 wherein physical connections between the second IWU and the slave uses Circuit Emulation according to ATM Adaptation Layer 2.

5. The communications system according to claim 1 wherein the master exchange switch uses a soft PVC signaling protocol to setup ATM connections between said first and second IWUs.

6. The communications system according to claim 1 wherein said master exchange switch determines the traffic needs of said network and allocates as many trunk circuits and establishes as many ATM connections as necessary to accommodate changing traffic needs of the network.

7. The communications system according to claim 1 further comprising a control link extending between said master exchange switch and said first IWU.

8. The communications system according to claim 7 wherein said control link is an Ethernet protocol connection.

9. The communications system according to claim 7 wherein said control link is utilized by said master exchange switch to verify connections at restart and deriving status indication information.

10. In a network comprising a master exchange switch that controls a plurality of slave exchange switches through one or more trunk signaling links, a method of dynamically allocating asynchronous transfer mode (ATM) connections between nodes in the network comprising the steps of:
    pooling all devices available to the master exchange switch into groups of virtual devices;
    determining if a new connection is needed in the network;
    allocating groups of virtual devices to provide said new connections, if needed, by first grouping a number of virtual devices into a route used to carry network traffic; and
    forming a signal pathway between said first IWU and said second IWU utilizing an ATM connection, wherein said master exchange is configured to control the slave exchange and set up said ATM connection through said first and second IWUs to dynamically create traffic routes extending from the master exchange to said slave exchange.

11. The method according to claim 10 further comprising the step of grouping a set if pooled devices to form a virtual channel for data traffic between any two nodes in the network.

12. The method according to claim 11 further comprising the step of utilizing the ATM Adaptation Layer 1 over said virtual channel.

13. The method according to claim 10 further comprising the step of signaling one or of the plurality of slave exchange switches according to the number of groups of virtual devices allocated.

* * * * *

UNITED STATES PATENT AND TRADEMARK OFFICE
CERTIFICATE OF CORRECTION

PATENT NO.         : 6,785,280 B1
APPLICATION NO. : 09/219577
DATED                 : August 31, 2004
INVENTOR(S)       : Lars A. Tovander It is certified that error appears in the above-identified patent and that said Letters Patent is hereby corrected as shown below:

Col. 6 line 34

The communications system according to claim 7 wherein said control link is utilized by said master exchange switch to verify connections at restart and --for-- deriving status indication information.

Col. 6 Claim 11, line 55
The method according to claim 10 further comprising the step of grouping a set --of-- "if" pooled devices to form a virtual channel for data traffic between any two nodes in the network.

Col. 6 Claim 13, line 62

The method according to claim 10 further comprising the step of signaling one or --more-- of the plurality of slave exchange switches according to the number of groups of virtual devices allocated.

Signed and Sealed this

Twelfth Day of December, 2006

JON W. DUDAS
*Director of the United States Patent and Trademark Office*